Figure 1:
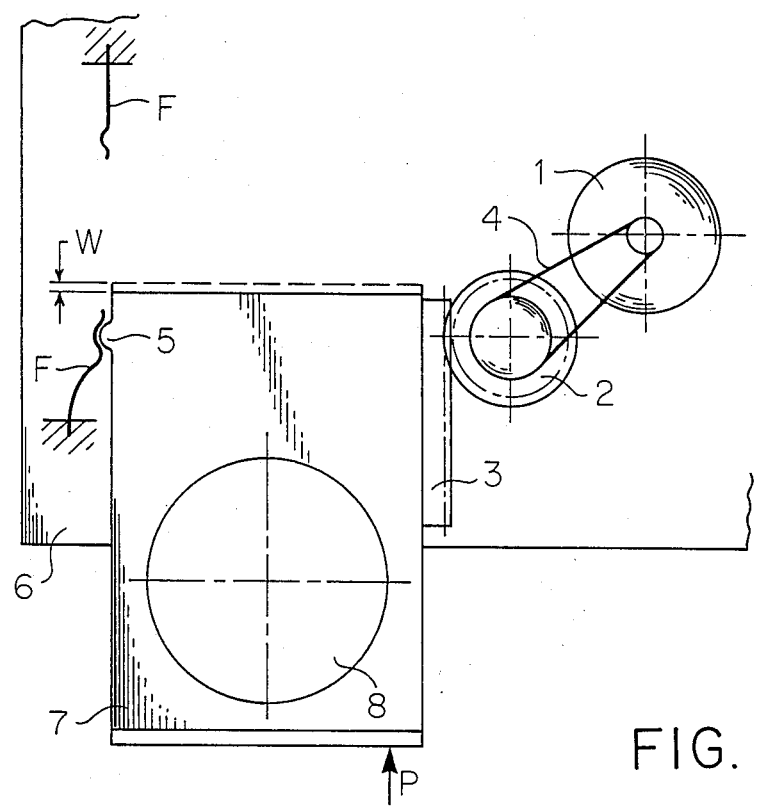

United States Patent [19]

Scheffler

[11] Patent Number: 4,809,254
[45] Date of Patent: Feb. 28, 1989

[54] DEVICE WITH AN AUTOMATIC RETRACTION MECHANISM

[75] Inventor: Wilfried Scheffler, Donaueschingen, Fed. Rep. of Germany

[73] Assignee: Deutsche Thomson-Brandt GmbH, Villingen-Schwenningen, Fed. Rep. of Germany

[21] Appl. No.: 142,456

[22] Filed: Jan. 7, 1988

[30] Foreign Application Priority Data

Jan. 31, 1987 [DE] Fed. Rep. of Germany ....... 3702887

[51] Int. Cl.$^4$ ............................................ G11B 17/035
[52] U.S. Cl. .................... 369/75.2; 318/136; 369/77.1
[58] Field of Search .................... 369/77.2, 97.1, 75.2; 318/136, 137, 446

[56] References Cited

U.S. PATENT DOCUMENTS

| 2,478,346 | 8/1949 | Van Doorn | 318/136 |
| 4,697,259 | 9/1987 | Takanashi | 369/75.2 |
| 4,723,185 | 2/1988 | Maeda | 369/77.2 |
| 4,730,296 | 3/1988 | Urata et al. | 369/77.2 |

Primary Examiner—Steven L. Stephan
Attorney, Agent, or Firm—Max Fogiel

[57] ABSTRACT

It is conventional in relation to automatic retraction mechanisms to position a switch that advances a slide-out compartment in and out either on the front surface of the compartment or behind it at a fixed point inside the device where it can be activated by the compartment, which the operator applies pressure over a short distance to for that purpose. The object of the invention is accordingly to provide a reliable, cost-effective, and user-friendly solution.

This object is attained with absolutely already existing components in that the retraction mechanism travels a short distance when pressed, accordingly rotating the rotor component of the motor (1) through the intermediary of the drive mechanism, a rack (3) and pinion (2) and if necessary a belt (4) for example, and causing it to generate electromagnetic force. The resulting pulse is processed in the form of a signal by a simple processing circuit (17) and supplied in the form of a switching command to controls, usually a microcomputer (18). The microcomputer turns on the motor voltage for a specific time and at a specific polarity.

8 Claims, 2 Drawing Sheets

DEVICE WITH AN AUTOMATIC RETRACTION MECHANISM

The invention concerns a device as recited in the preamble to claim 1.

Automatic retraction mechanisms are known, for the retraction and release of media with video and audio signals recorded on them for example. The disk-shaped medium is intercepted once it has been manually introduced into a slot-like horizontal opening, usually on the front of the device, and a leaf-spring contact switches on the motor that drives the retraction mechanism and another contact switches it off once the retraction is complete. Release is initiated, either automatically or by activating a button provided for that purpose, once the medium has been scanned through.

A powered device to facilitate loading and unloading a record player is known from German A No.1 3 608 662. It incorporates a moving sensor of the friction-wheel type to switch the retraction motor on and off. Both its switching contacts and the way they are wired increase the expense of the device and and make it subject to frequent malfunction.

Most of the compact-disk players now being sold feature a motor-driven slide-out compartment. The compartment is advanced and a compact disk positioned in it, a START or OPEN/CLOSE button is pressed, and the disk is introduced into the playing position by the closing compartment. Once the disk has been played, the compartment slides out again and the disk can be removed from it. The motion of the slide-out compartment is controlled by a toothed rack and pinion and if necessary a belt to transmit the force and direction of rotation of the motor. The motion of the compartment is usually initiated by pressing against its front surface, either because a switch is positioned at that point and is accordingly a component of the compartment mechanism or because manually pushing the compartment just slightly in activates a switch that is integrated into the mechanism at a fixed point. Known examples of this approach include the Hitachi DA 800 and the Telefunken HS 980 compact-disk players.

These embodiments are complicated, demand very flexible cable connections, and break down easily.

The object of the present invention is accordingly to eliminate the aforesaid drawbacks and provide a cost-effective and simple solution that does not break down readily and is also user-friendly.

This object is attained in accordance with the invention by the characteristics recited in claim 1. Further developments will be evident from the subsidiary claims and from the following description of one embodiment.

The invention provides a retraction mechanism that exploits the drive motor itself as a pulse generator. The motion of the slide-out compartment is initiated by briefly pressing against its front surface in that the short distance accordingly traveled by the compartment rotates, through the intermediary of the compartment drive mechanism, specifically the rack and pinion, the belt, and the motor, the rotor component of the motor, generating a brief electromagnetic force. This voltage pulse is supplied through a recognition-and-pulse forming stage to controls, a microcomputer for example. The microcomputer recognizes the pulse as a START signal and switches on the motor voltage.

This approach is followed in a highly practical way without any expensive additional components in that the slide-out compartment is designed such that, when pressure is applied to its front surface, it will travel a brief distance out of its snapped-in position against the force of a spring and then back into the same position subject to the force of the spring.

One embodiment of the invention will now be specified with reference to the drawing, wherein FIG. 1 is a highly simplified top view of a compartment advanced out of the housing of the device along with the mechanism that drives it.

Figure 2:
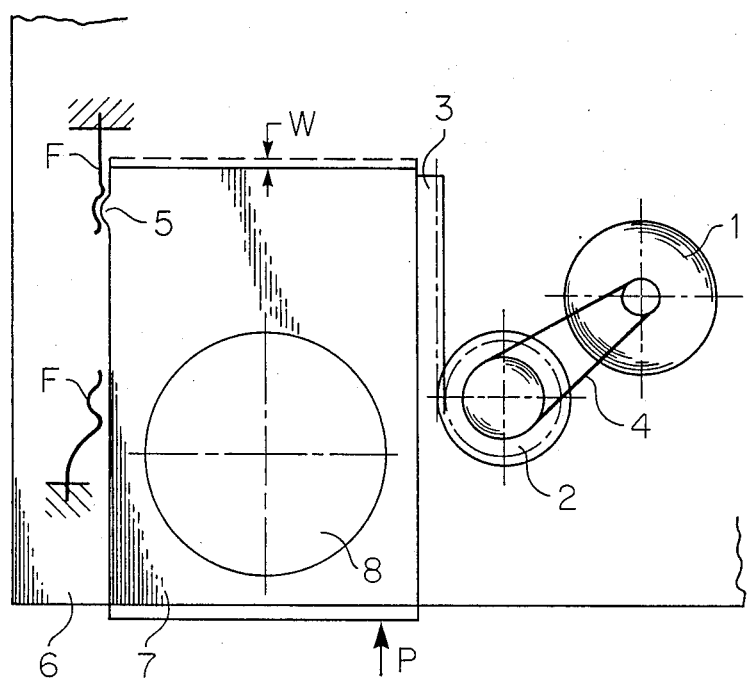
Figure 3:
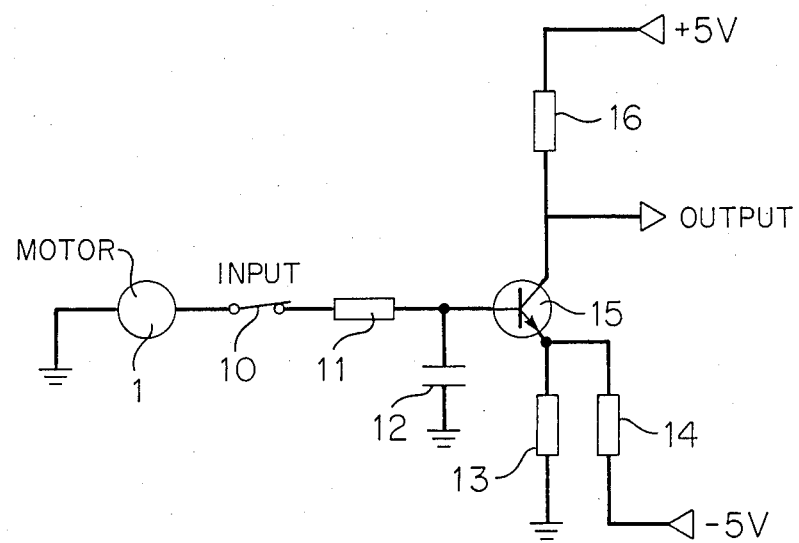
Figure 4:
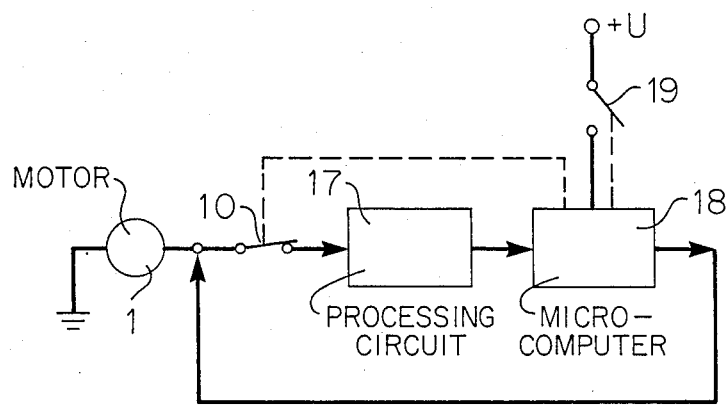

FIG. 2 is a highly simplified top view of the compartment inside the housing of the device along with the mechanism that drives it, FIG. 3 is a simple circuit for processing the electromagnetic force, and FIG. 4 is a block diagram illustrating the motor, processing circuit, and controls.

FIGS. 1 and 2 are schematic illustrations of a slide-out compartment 7 that can be advanced out of the housing 6 of a compact-disk player to accommodate a compact disk and introduced back into the housing, along with the mechanisms that govern these motions and that consist of a motor 1, a belt 4 and a rack 3 and pinion 2. Compartment 7 is designed such that, when it is in either position, even in the snapped-in position wherein a spring F engages a nose 5, a slight pressure P applied against its front surface will move it over a short distance W, which can be only 2 to 3 mm for example, causing it to rotate the rotor of motor 1 through the intermediary of the aforesaid drive mechanisms. This operation generates an electromagnetic force that is recognized as a switching signal by an electronic circuit and forwarded to controls. The controls, which can be a microcomputer for example, respond by generating an operating voltage with a specific polarity for a specific period of time. The correct rotation of motor 1 can be conventionally derived from the sequence of "engage" and "disengage" commands.

FIG. 2 illustrates a simple processing circuit with a transistor 15 with its collector connected through a resistor 16 to a +5-V connection and its emitter through another resistor 14 to a −5-V connection. A third resistor 13 provides negative bias, which is unnecessary when the electromagnetic force is powerful enough. There is a grounded capacitor 12 at the base to de-charter the output signal. The electromagnetic force from motor 1 is supplied to the base through a normally closed switch 10 and a resistor 11, elevated to a conventional TTL (5V) level by the processing circuit, and released at the collector output terminal.

The block diagram in FIG. 4 shows motor 1, switch 10, processing circuit 17, microprocessor 18, and the connections necessary to operate the device. Switch 10 is opened by microcomputer 18 only when the latter receives a switching pulse from processing circuit 17, and supplies motor voltage until it opens a limit switch 19 connected to its + input terminal, interrupting the voltage to motor 1 as soon as the desired compartment motion is complete.

As soon as the brief pressure against the front surface is released with slide-out compartment 7 inside the housing (FIG. 2), when, that is P=0, the compartment will return to the snapped-in position, and only then will the compact disk be shifted vertically in an unillustrated way into the transport position, where it can be advanced out along with the compartment.

I claim:

1. An arrangement with automatic retraction means, comprising: a housing with a retraction opening: a motor with a rotor; linage means a slide-out compartment for transporting an article, said compartment being driven by said motor through said linkage means: said compartment being shiftable over a predetermined distance upon applying pressure to a front surface of said compartment, movement of said compartment through said predetermined distance rotating said rotor of said motor and generating an electromagnetic impulse; control means recognizing said impulse as a start signal for applying voltage to said motor to move said compartment.

2. An arrangement as defined in claim 6, including a slide-out compartment for transporting said article, said compartment being driven by said motor through said linkage means: said linkage means comprising rack and pinion means, said compartment being driven so that the compartment will travel into and out of a predetermined snapped-in position; resilient elements demarcating two snapped-in positions of said article; said compartment shifting over a predetermined distance upon applying pressure to a front surface of said compartment, motion of said compartment through said predetermined distance actuating said linkage means and rotating said rotor of said motor and generating said electromagnetically induced impulse; control means recognizing said impulse as a start signal for applying voltage to said motor to drive said compartment.

3. An arrangement as defined in claim 2, including a processing circuit connected to said control means for recognizing said impulse.

4. An arrangement as defined in claim 2, wherein said control means comprises a microcomputer.

5. An arrangement as defined in claim 2, including means in said control means for recognizing the last motion of said compartment by storing a signal indicating said last motion for insuring that said motor rotates in a direction that will always be correct in relation to a subsequent motion carried out after said last motion.

6. An arrangement as defined in claim 2, including belt means operating with said rack means and pinion means in said linkage means.

7. An arrangement with automatic retraction means, comprising: a housing with a retraction opening; a motor with a rotor; linkage means a slide-out compartment for transporting said article, said compartment being driven by said motor through said linkage means; said linkage mans comprising a rack and pinion means for driving said compartment into and out of a predetermined snapped-in position; resilient elements demarcating two snap-in positions of said compartment; said compartment being shiftable over a predetermined distance upon applying pressure to a front surface of said compartment, movement of said compartment through said predetermined distance rotating said rotor of said motor and generating an electromagnetic impulse; control means recognizing said impulse as a start signal for applying voltage to said motor to move said compartment; a processing circuit connected to said control emans for recognizing unambiguous start signals; said control means comprising a microcomputer; said control means having means for recognizing the last motion of said compartment by storing a signal indicating said last motion to ensure that said motor rotates in a direction that will always be correct in relation to a subsequent motion carried out after said last motion.

8. An arrangement with automatic retraction means, comprising: a housing with a retraction opening; a motor with a rotor; linkage mans a slide-out compartment for transporting said article, said compartment being driven by said motor through said linkage means; said linkage means comprising a rack and pinion means for driving said compartment into and out of a predetermined snapped-in position; resilient elements demarcating two snapped-in positions of said compartment; said compartment being shiftable over a predetermined distance upon applying pressure to a front surface of said compartment, movement of said compartment through said predetermined distance rotating said rotor of said motor and generating an electromagnetic impulse; control means recognizing said impulse as a start signal for applying voltage to said motor to move said compartment; a processing circuit connected to said control means for recognizing unambiguous start signals; said control means comprising a microcomputer; said control means having means for recognizing the last motion of said compartment by storing a signal indicating said last motion to ensure that said motor rotates in a direction that will always be correct in relation to a subsequent motion carried out after said last motion; said article comprising a compact disk; said resilient elements comprising spring means engaging a nose; said predetermined distance being within the range of two to three mm; said processing circuit comprising a transistor with collector connected through a resistor to a positive terminal through a second transistor to a negative terminal of said voltage source; a grounded capacitor connected to the base of said transistor to remove chatter from the output signal of said transistor; said electromagnetic impulse from said motor being applied to the base of said transistor; switch means opened by said microcomputer only when said microcomputer receives a switching pulse from said processing circuit and supplying motor voltage until a limit switch is opened.

* * * * *

UNITED STATES PATENT AND TRADEMARK OFFICE
CERTIFICATE OF CORRECTION

PATENT NO. : 4,809,254

DATED : February 28, 1989

INVENTOR(S) : Scheffler

It is certified that error appears in the above-identified patent and that said Letters Patent is hereby corrected as shown below:

Claim 2, line 1, column 3, line 14, "6" should read --1--.

Signed and Sealed this

Twenty-ninth Day of August, 1989

Attest:

DONALD J. QUIGG

Attesting Officer

Commissioner of Patents and Trademarks